United States Patent Office 2,779,669
Patented Jan. 29, 1957

2,779,669

ACYL PSEUDOUREA HERBICIDAL COMPOSITION AND A METHOD FOR KILLING WEEDS THEREWITH

Jack A. Snyder, Wilmington, Del., assignor to E. I. du Pont de Nemours and Company, Wilmington, Del., a corporation of Delaware No Drawing. Application February 18, 1954,
Serial No. 411,279

2 Claims. (Cl. 71—2.6)

This invention relates to herbicidal compositions and methods employing acyl pseudoureas as essential active ingredients.

The acyl pseudoureas, as is indicated by the name, are characterized by the following structure (1)
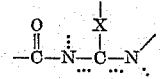

where X is oxygen or sulphur. The broken lines in Formula 1 above are used in the conventional sense to indicate that the double bond can be between one or the other of the nitrogen atoms and the intermediate carbon atom. Thus the compounds are those having the structure (2)
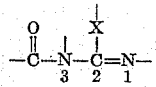

or (3)
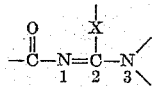

The free valences shown in the above compounds can be variously substituted, as will be described below, the important moiety contributing to herbicide activity being the above indicated acyl pseudourea structures.

More specifically, the acyl pseudoureas of the invention are selected from compounds represented by the formulas (4)
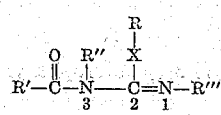

and (5)
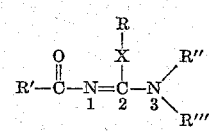

where X is oxygen or sulphur, R is an organic radical and preferably lower alkyl or lower alkenyl, which radicals may contain various substituents such as chlorine and other halogens, nitro, hydroxy, methoxy, methylmercapto, and the like; R', R'', and R''' are hydrogen or organic radicals, R' being preferably aryl and substituted aryl, and more preferably phenyl or substituted phenyl such as p-chlorophenyl, 3,4-dichlorophenyl, and similar mono or polyhalogenated phenyls, nitrophenyl, aminophenyl, methoxyphenyl, tolyl, xylyl, chlorotolyl, methylmercaptophenyl, methylsulfonylphenyl and similar commonly substituted phenyl radicals; and R'' and R''' are preferably hydrogen lower alkyl or lower alkenyl, which radicals may contain various substituents such as chlorine and other halogens, nitro, hydroxy, methoxy, methylmercapto and the like. Note that whenever "lower" is used of a group herein, the expression in accordance with common practice is intended to cover groups having no more than six carbon atoms.

The acyl pseudoureas employed in the herbicidal compositions and methods of this invention are suitably prepared in general by a Schotten-Baumann type of reaction. A preparation of this kind is shown by R. H. McKee, Am. Chem. J., 26, 209 (1901). The reaction can be illustrated by the preparation of 3-(3,4-dichlorobenzoyl)-2-methylpseudourea by the reaction of 3,4-dichlorobenzoyl chloride with methyl pseudourea in aqueous alkaline medium:

(6)
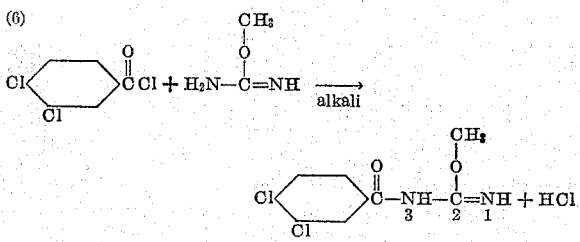

While the above equation shows the preparation of an acyl pseudourea in which the pseudourea has been acylated in the 3 position rather than on nitrogen 1, it will be understood that in general with reactions of this kind one may obtain a mixture of a product of the above kind of structure with one in which the acylation occurs at the number 1 nitrogen. In general, acylation at the 3 position, as shown in the above equation, is favored at low temperatures and at elevated temperatures the acylation at the number 1 nitrogen predominates.

The acyl pseudoureas obtained can be separated from the reaction mixture, and in the case of isomeric mixtures from each other, using conventional selective solvent extraction techniques or fractional crystallization procedures. In general, the separation of the isomeric forms is not difficult because of the normally marked differences in physical properties of the isomers.

Herbicidal compositions of the invention are prepared by admixing one or more of the acyl pseudoureas defined heretofore, in herbicidally effective amounts, with a conditioning agent of the kind used and referred to in the art as a pest control adjuvant or modifier to provide formulations adapted for ready and efficient application to soil or weeds (i. e., unwanted plants) using conventional applicator equipment.

Thus the herbicidal compositions or formulations are prepared in the form of solids or liquids. Solid compositions are preferably in the form of dusts and are compounded to give homogeneous free-flowing dusts by admixing the active compound or compounds with finely divided solids preferably talcs, natural clays, pyrophyllite, diatomaceous earth or flours such as walnut shell, wheat, redwood, soya bean, cottonseed flours and other inert solid conditioning agents or carriers of the kind conventionally employed in preparing pest control compositions in dusts or powdered form.

Liquid compositions of the invention are prepared in the usual way by admixing one or more of the acyl pseudoureas with a suitable liquid diluent media. With certain solvents such as alkylated naphthalene, dimethylformamide, and cresol, relatively high, up to about 35% by weight or more, concentrations of the acyl pseudoureas can be obtained in solution. Other liquids conventionally used in preparing liquid herbicidal compositions are for the most part less effective solvents.

The herbicidal compositions of the invention whether in the form of dusts or liquids preferably also include a surface-active agent of the kind sometimes referred to in the art as a wetting, dispersing, or emulsifying agent.

These agents, which will be referred to hereinafter more simply as surface-active dispersing agents, cause the compositions to be easily dispersed in water to give aqueous sprays which, for the most part, constitutes a desirable composition for application.

The surface-active dispersing agents employed can be of the anionic, cationic, or nonionic type and include, for example, sodium and potassium oleate, the amine salts of oleic acid such as morpholine and dimethylamine oleates, the sulfonated animal and vegetable oils such as sulfonated fish and castor oils, sulfonated petroleum oils, sulfonated acyclic hydrocarbons, sodium salt of lignin sulfonic acid (goulac), alkylnaphthalene sodium sulfonate, sodium salts of sulfonated condensation products of naphthalene and formaldehyde, sodium lauryl sulfate, disodium monolauryl phosphate, sorbitol laurate, pentaerythritol monostearate, glycerol monostearate, diglycol oleate, polyethylene oxides, ethylene oxide condensation products witth stearyl alcohol and octylphenol, polyvinyl alcohols, salts, such as the acetate of polyamines from reductive amination of ethylene/carbon monoxide polymers, laurylamine hydrochloride, laurylpyridinium bromide, stearyltrimethylammonium bromide, cetyldimethylbenzyl ammonium chloride, lauryldimethylamine oxide, and the like. Generally, the surface-active agent will not comprise more than about 5 to 15% by weight of the composition, and in certain compositions the percentage will be 1% or less. Usually the minimum lower concentration will be 0.1%.

The herbicidal compositions are applied either as a spray or a dust to the locus or area to be protected from undesirable plant growth, commonly called weeds, i. e., plants growing where they are not wanted. Such application can be made directly upon the locus or area and the weeds thereon during the period of weed infestation in order to destroy the weeds, but preferably, the application is made in advance of an anticipated weed infestation to prevent such infestation. Thus, the compositions can be applied as aqueous foliar sprays but can also be applied as sprays directly to the surface of the soil. Alternatively, the dry powdered compositions can be dusted directly on the plants or on the soil.

The active compound is, of course, applied in amount sufficient to exert the desired herbicidal action. The amount of the active compound present in the compositions as actually applied for destroying or preventing weeds will vary with the manner of application, the particular weeds for which control is sought, the purpose for which the application is being made, and like variables. In general, the herbicidal compositions as applied in the form of a spray or a dust will contain from about 0.5% to 85% by weight of acyl pseudoureas.

Fertilizer materials, other herbicidal agents, and other pest control agents such as insecticides and fungicides can be included in the herbicidal compositions of the invention if desired.

In order that the invention may be better understood, the following examples are given in addition to the examples already given above.

EXAMPLE 1

To a solution of 5 parts by weight of 2-methyl pseudourea hydrochloride in 35 parts by weight of 10% aqueous potassium hydroxide, there was added 7.92 parts by weight of para-chlorobenzoyl chloride. The mixture was agitated vigorously for 30 minutes. Heat was liberated during the reaction but the temperature did not exceed 60° C.

After standing at room temperature for an additional 30 minutes, the crude product which had precipitated was filtered, washed with 10% aqueous potassium hydroxide solution and with water and then dried in vacuum. There was obtained 10.05 parts by weight of crude 3-(p-chlorobenzoyl)-2-methylpseudourea, M. P. 82–92° C. After recrystallizing twice from aqueous methanol, the product had a melting point of 80–86° C.

*Analysis.*—Calc'd for $C_9H_9ClN_2O_2$: C, 50.9; H, 4.27. Found: C, 51.2; H, 4.43.

The herbicidal properties of the acyl pseudoureas are illustrated by the results obtained from application of an aqueous spray containing as the active ingredient only 1% of the compound prepared as described above in this example. Johnson grass and tomato plants thus treated wilted quite rapidly and when observed 19 days later, the tomato plants were completely dead and the Johnson grass severely injured.

EXAMPLE 2

*Dust formulations*

The following compositions are adapted for direct application as dusts for the destruction or prevention of weeds using conventional dusting equipment. The dusts are made by blending or mixing the ingredients and grinding the mix to give compositions having an average particle size less than about 50 microns.

A

| | |
|---|---|
| 3-(p-chlorobenzoyl)-1,2,3-trimethyl pseudourea | 20 |
| Talc | 80 |
| | 100 |

B

| | |
|---|---|
| 3-(m-toluyl)-1,2,3-trimethylpseudourea | 5 |
| Cottonseed oil | 4 |
| Walnut shell flour | 91 |
| | 100 |

The numbers given at the right in the above tabulations, and in the tabulations in subsequent examples of formulations of the invention, represent parts by weight.

EXAMPLE 3

*Water-dispersible powders*

The following powdered compositions are adapted for dispersing in water for application as a spray for the destruction and prevention of weeds. The powdered compositions are made by intimately mixing the listed ingredients using conventional mixing or blending equipment and then grinding the mixture to give a powder having an average particle size less than about 50 microns.

A

| | |
|---|---|
| 3-(p-chlorobenzoyl)-3-(p-chlorophenyl)-2-methylpseudourea | 75 |
| Fuller's earth | 23.75 |
| Sodium lauryl sulfate, 50% (wetting agent) | 1 |
| Methyl cellulose, 15 cps. (dispersing agent) | 0.25 |
| | 100 |

B

| | |
|---|---|
| 3-(p-chlorobenzoyl)-1,3-di-(p-chlorophenyl)-2-methylpseudourea | 80 |
| Sodium disulfonate of dibutyl phenylphenol (wetting and dispersing agent) | 2 |
| Bentonite | 18 |
| | 100 |

EXAMPLE 4

*Oil-water dispersible powders*

The following powdered compositions are adapted for use in the preparation of spray compositions using either an oil, water, or a combination of oil and water as the liquid diluent. The powders are made by mixing and grinding as in the case of the powders of Example 2.

A

| | |
|---|---|
| 3-acetyl-2-methylpseudourea | 70 |
| Alkylated aryl polyether alcohol (wetting and dispersing agent) | 4 |
| Fuller's earth | 26 |
| | 100 |

B

| | |
|---|---|
| 3-formyl-2-methylpseudourea | 80 |
| Ethylene oxide stearate-laurate (emulsifying agent) | 4 |
| Prophyllite | 16 |
| | 100 |

EXAMPLE 5

*Water-dispersible liquid compositions*

The following compositions are in a liquid form and are adapted for addition to water to give aqueous dispersions for application as sprays. In the case of some acyl pseudoureas, the compositions will not be complete solutions but rather will be in part dispersions of solid in an oil. The liquid or fluid compositions shown are prepared by thoroughly mixing or dispersing the active compounds and conditioning agent or agents in an organic liquid diluent.

A

| | |
|---|---|
| 1-(p-chlorophenyl)-3-formyl-2-methylpseudourea | 25 |
| Long chain fatty alcohol sulfate (emulsifying agent) | 2 |
| Goulac (dispersing agent) | 3 |
| Kerosene | 70 |
| | 100 |

B

| | |
|---|---|
| 3-(chloroacetyl)-2-methylpseudourea | 30 |
| Alkylated aryl polyether alcohol (wetting and emulsifying agent) | 3 |
| Methyl cellulose (dispersing agent) | 1 |
| Kerosene | 66 |
| | 100 |

EXAMPLE 6

*Granular compositions*

The following compositions are adapted for application by a means of a fertilizer spreader apparatus or similar equipment. The compositions are readily prepared by mixing the ingredients with water to form a paste. The paste is then extruded, dried, and ground to give the desired granular size. Preferably, the granules will be in the order of one-thirty second to one-quarter inch diameter.

A

| | |
|---|---|
| 3-benzoyl-2-methylpseudourea | 10 |
| Goulac (dispersing agent) | 3 |
| Hydrocarbon oil | 1 |
| Dextrin (binding agent) | 20 |
| Fuller's earth | 66 |
| | 100 |

B

| | |
|---|---|
| 3-(2-furoyl)-2-methylpseudourea | 7 |
| Goulac | 3 |
| Refined kerosene | 1 |
| Gelatin | 25 |
| Talc | 64 |
| | 100 |

The following compounds are given as further examples of acyl pseudoureas employed in the compositions and methods of the invention and it will be understood that such compounds can be used in place of the various compounds specifically shown in the foregoing detailed examples:

1. 1-benzoyl-2-methylpseudourea
2. 1-benzoyl-2,3-dimethylpseudourea
3. 1-benzoyl-2-methyl-3-phenylpseudourea
4. 1-formyl-2-methylpseudourea
5. 1-acetyl-2-methylpseudourea
6. 1-(p-chlorobenzoyl)-2-methylpseudourea
7. 1-(3,4-dichlorobenzoyl)-2-methylpseudourea
8. 1-(m-toluyl)-2-methylpseudourea
9. 1-benzoyl-2-ethylpseudourea
10. 1-benzoyl-2-(1-propyl)pseudourea
11. 1-benzoyl-2-(2-propyl)pseudourea
12. 1-benzoyl-2-(1-butyl)pseudourea
13. 1-benzoyl-2-allylpseudourea
14. 1-benzoyl-2-phenylpseudourea
15. 1-benzoyl-2-methyl-2-thiopseudourea
16. 1-(p-chlorobenzoyl)-2,3-dimethylpseudourea
17. 1 - (p - chlorobenzoyl)-3-(p-chlorophenyl)-2-methylpseudourea
18. 1 - (p - chlorobenzoyl) - 3-(3,4-dichlorophenyl)-2-methylpseudourea
19. 1-(p-chlorobenzoyl)-3-allyl-2-methylpseudourea
20. 1-(p-bromobenzoyl)-2-ethylpseudourea
21. 1-(p-chlorobenzoyl)-2-allylpseudourea
22. 1-(p-chlorobenzoyl)-2-chloromethylpseudourea
23. 1-(p-chlorobenzoyl)-2-(p-chlorophenyl)pseudourea
24. 1-(p-chlorophenyl)-2-phenylpseudourea
25. 1-formyl-3-methyl-2-ethylpseudourea
26. 1-acrylyl-2-allyl-3-(p-chlorophenyl)pseudourea
27. 1-(p-chlorobenzoyl)-2,3,3-trimethylpseudourea
28. 1 - (3,4 - dichlorobenzoyl) - 3,3-dibutyl-2-methylpseudourea
29. 1-(3,4-dichlorobenzoyl)-2,3,3-triallylpseudourea
30. 1-(p-nitrobenzoyl)-2-methylpseudourea
31. 1-(p-aminobenzoyl)-2-methylpseudourea
32. 1-(p-methoxybenzoyl)-2-methylpseudourea
33. 1-(m-toluyl)-2-allylpseudourea
34. 1-(3,4-dimethylbenzoyl)-2-methylpseudourea
35. 1-(3-chloro-4-methylbenzoyl)-2-methylpseudourea
36. 1-(p-methylmercaptobenzoyl)-2-methylpseudourea
37. 1-(p-chlorobenzoyl)-2-methyl-2-thiopseudourea
38. 1-(3,4-dichlorobenzoyl)-2-methyl-2-thiopseudourea
39. 1 - (p - chlorobenzoyl) - 2 - hexylpseudourea
40. 3 - benzoyl - 2 - methylpseudourea
41. 3 - benzoyl - 1,2 - dimethylpseudourea
42. 3 - benzoyl - 1 - phenyl - 2 - methylpseudourea
43. 3 - benzoyl - 2,3 - dimethylpseudourea
44. 3 - benzoyl - 3 - phenyl - 2 - methylpseudourea
45. 3 - formyl - 2 - methylpseudourea
46. 3 - acetyl - 2 - methylpseudourea
47. 3 - (p - chlorobenzoyl) - 2 - methylpseudourea
48. 3 - (3,4 - dichlorobenzoyl) - 2 - methylpseudourea
49. 3 - (m - toluyl) - 2 - methylpseudourea
50. 3 - benzoyl - 2 - ethylpseudourea
51. 3 - benzoyl - 2 - (1 - propyl)pseudourea
52. 3 - benzoyl - 2 - (2 - propyl)pseudourea
53. 3 - benzoyl - 2 - (1 - butyl)pseudourea
54. 3 - benzoyl - 2 - allylpseudourea
55. 3 - benzoyl - 2 - phenylpseudourea
56. 3 - benzoyl - 2 - methyl - 2 - thiopseudourea
57. 3 - (hexahydrobenzoyl) - 2 - methylpseudourea
58. 3 - (3 - caproyl) - 2 - methylpseudourea
59. 3 - (acrylyl) - 2 - methylpseudourea
60. 3 - (trichloroacetyl) - 2 - methylpseudourea
61. 3 - (p - chlorobenzoyl) - 3 - chlorophenyl - 1,2 - dimethylpseudourea
62. 3 - (2,4 - dichlorobenzoyl) - 2 - methylpseudourea
63. 3 - (p - chlorobenzoyl) - 2,3 - dimethylpseudourea
64. 3 - (p - chlorobenzoyl) - 2 - ethylpseudourea
65. 3 - (p - chlorobenzoyl) - 2 - allylpseudourea
66. 3 - (p - chlorobenzoyl) - 2 - ($\beta$ - chloroethyl)pseudourea
67. 3 - (p - chlorobenzoyl) - 2 - phenylpseudourea 68. 3 - (p - chlorobenzoyl) - 2 - (p - chlorophenyl)pseudourea
69. 3 - acrylyl - 3 - (p - chlorophenyl) - 2 - allylpseudourea
70. 3 - benzoyl - 3 - (3,4 - dichlorophenyl) - 2 - (β - chloroethyl)pseudourea
71. 3 - allyl - 3 - (2 - furoyl) - 2 - (p - chlorophenyl)pseudourea
72. 3 - (p - chlorobenzoyl) - 1,2 - dimethylpseudourea
73. 3 - (3,4 - dichlorobenzoyl) - 2,3 - dimethylpseudourea
74. 3 - benzoyl - 3 - (p - chlorophenyl) - 1 - allyl - 2 - phenylpseudourea
75. 3 - (p - chlorobenzoyl) - 2 - methyl - 2 - thiopseudourea
76. 3 - (3,4 - dichlorobenzoyl) - 2 - methyl - 2 - thiopseudourea
77. 3 - formyl - 3 - phenyl - 2 - methyl - 2 - thiopseudourea
78. 3 - (p - methylsulfonylbenzoyl) - 2 - methylpseudourea
79. 1 - (4 - chloro - 3 - methylbenzoyl) - 2 - methylpseudourea
80. 3 - (2,4,5 - trichlorobenzoyl) - 2 - methylpseudourea
81. 3 - (1 - naphthoyl) - 2 - methyl pseudourea.

It should be noted that in the nomenclature used in the foregoing description of compounds employed in the compositions and methods of the invention, the numbering of the substituents is in accordance with the numbering shown on the skeletal formulas (2) and (3) hereinabove; in other words, the nitrogen linked to the ureido carbon by a double bond is number 1, the other nitrogen number 3, and the ureido carbon is number 2.

Those skilled in the art will appreciate that other acyl pseudoureas can be prepared and employed in the compositions and methods of the invention. Thus the foregoing detailed description has been given for clearness of understanding only and no unnecessary limitations are to be understood therefrom.

I claim:
1. A method for the control of weeds which comprises applying to a locus to be protected, in amount sufficient to exert a herbicidal action, an acyl pseudourea selected from the group consisting of compounds represented by the formulas

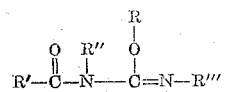

and

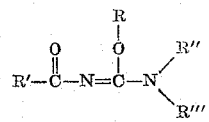

where R is from the group consisting of substituted and unsubstituted alkyl and alkenyl organic radicals of 1 to 4 carbons, R' is from the group consisting of phenyl and substituted phenyl radicals, and R" and R''' are from the group consisting of hydrogen and substituted and unsubstituted alkyl and alkenyl organic radicals of 1 to 6 carbons.

2. A herbicidal composition comprising a material selected from the group consisting of anionic, cationic and nonionic organic surface-active dispersing agents and, in amount sufficient to exert herbicidal action, an acyl pseudourea selected from the group consisting of compounds represented by the formulas

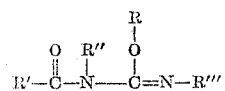

and

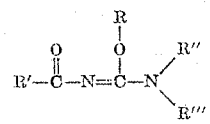

where R is from the group consisting of substituted and unsubstituted alkyl and alkenyl organic radicals of 1 to 4 carbons, R' is from the group consisting of phenyl and substituted phenyl radicals, and R" and R''' are from the group consisting of hydrogen and substituted and unsubstituted alkyl and alkenyl organic radicals of 1 to 6 carbons.

References Cited in the file of this patent
UNITED STATES PATENTS

| | | |
|---|---|---|
| 2,302,762 | Groenacker et al. | Nov. 24, 1942 |
| 2,336,868 | Joyne et al. | Dec. 14, 1943 |
| 2,547,366 | Bock et al. | Apr. 3, 1951 |

OTHER REFERENCES

Basterfield et al.: "Acyl Iso-Ureas," J. A. C. S., vol. 49, Dec. 1927, pages 3177 to 3180 inclusive.

Dieke et al.: "The Acute Toxicity of Thioureas and Related Compounds to Wild and Domestic Norway Rats," Journal of Pharmacology, vol. 90, 1947, pages 260 to 270 inclusive.